United States Patent [19]
Argabright et al.

[11] Patent Number: 5,298,230
[45] Date of Patent: Mar. 29, 1994

[54] PROCESS FOR THE EFFICIENT CATALYTIC REDUCTION OF NITROGEN OXIDES

[75] Inventors: Steven C. Argabright, St. Charles; Roy A. Johnson, Glen Ellyn, both of Ill.

[73] Assignee: Nalco Fuel Tech, Naperville, Ill.

[21] Appl. No.: 876,973

[22] Filed: May 1, 1992

[51] Int. Cl.$^5$ .............................. B01J 8/00; C01B 21/00
[52] U.S. Cl. .................................. 423/239.1; 423/235
[58] Field of Search ............... 423/213.2, 235, 235 D, 423/239, 239 D

[56] References Cited

U.S. PATENT DOCUMENTS

| | | | |
|---|---|---|---|
| 4,003,979 | 1/1977 | Kanno | 423/239 |
| 4,107,272 | 8/1978 | Mori et al. | 423/239 |
| 4,138,469 | 2/1979 | Kato et al. | 423/239 |
| 4,268,488 | 5/1981 | Ginger | 423/239 |
| 4,393,031 | 7/1982 | Henke | 423/239 |
| 4,473,536 | 9/1984 | Carberg et al. | 423/239 |
| 4,978,514 | 12/1990 | Hofmann et al. | 423/235 |

FOREIGN PATENT DOCUMENTS

| | | |
|---|---|---|
| 1100292 | 3/1981 | Canada . |
| WO210392 | 2/1987 | European Pat. Off. . |
| 52-8975 | 1/1977 | Japan .................................. 423/235 |

Primary Examiner—Gregory A. Heller
Attorney, Agent, or Firm—St. Onge Steward Johnston & Reens

[57] ABSTRACT

A process for the reduction of nitrogen oxides in the effluent of a gas turbine is presented. This process comprises forming an emulsion which comprises water and fuel oil and combusting the emulsion in the combustion can of a gas turbine to form an effluent; and contacting the effluent with a catalyst effective for the reduction of nitrogen oxides therein.

11 Claims, 3 Drawing Sheets

PROCESS FOR THE EFFICIENT CATALYTIC REDUCTION OF NITROGEN OXIDES

TECHNICAL FIELD

The present invention relates to a process which leads to a reduced concentration of nitrogen oxides ($NO_x$, where x is an integer, generally 1 or 2) in the effluent from the combustion of carbonaceous fuels and other organic matter. The process involves improvements in the combustion efficiency of a gas turbine followed by the catalytic reduction of nitrogen oxides in an efficient, economical, and safe manner not heretofore seen.

Gas or combustion turbines have been utilized by many utilities as peaking units to rapidly bring additional electrical generation on line as required and, hence, are preferred for many applications. Unfortunately, the temperatures at which gas turbines operate tend to cause the production of thermal $NO_x$, the temperatures being so high that free radicals of oxygen and nitrogen are formed and chemically combine as nitrogen oxides. Nitrogen oxides are troublesome pollutants and comprise a major irritant in smog. It is further believed that nitrogen oxides can cause or enhance the process known as photochemical smog formation through a series of reactions in the presence of sunlight and hydrocarbons.

Moreover, nitrogen oxides are a significant contributor to acid rain and have been implicated in the undesirable warming of the atmosphere through what is known as "the greenhouse effect" and in the depletion of the ozone layer. In addition, gas turbines often emit a visible plume, which is highly undesirable since it causes concern among the population in areas surrounding the facility.

Recently, many processes for the reduction of $NO_x$ levels in combustion effluents have been developed. They can generally be divided into two categories: pre-combustion and post-combustion. "Pre-combustion $NO_x$ reducing processes" refers to processes which involve treatment of the fuel or creation of combustion conditions in a manner effective to reduce the amount of $NO_x$ formed during or immediately after combustion; "post-combustion $NO_x$ reducing processes" refers to processes which involve treating the combustion effluent in a manner effective to reduce the nitrogen oxides which have already been formed.

Among the post-combustion processes there is a further division between selective and non-selective $NO_x$ reduction processes. The selective processes are believed in the art to be the more desirable and are further divided into selective catalytic reduction (SCR) and selective non-catalytic reduction (SNCR) processes.

It has been known for some time that the injection of water directly into the combustion zone (also referred to as the "combustion can") of a gas turbine at water to fuel ratios of greater than 1:1 can control the emission of $NO_x$ and reduce plume opacity. The direct injection of water into the combustion can, though, requires extensive mechanical modification of the gas turbine (with high capital costs) and involves the injection of large volumes of demineralized water which often results in additional maintenance and outage time because of thermal shock to the combustion can.

Although the use of emulsified oils (primarily produced by relatively simple, mechanical techniques) for combustion improvements has been suggested in the past, there has been no clear suggestion of their use in gas turbines and the oils emulsified are usually heavy oils (i.e., No. 6 oil). Because gas turbines are peaking units, fuel is required to remain emulsified for at least 30 days in a holding tank, and at least two hours during in-line mixing. This has been difficult to accomplish, especially when using mechanical emulsion methodology. In addition, gas turbines are very sensitive to corrosion which often leads the practitioner to avoid introducing emulsified water into the combustion zone.

Selective catalytic $NO_x$ reducing processes are generally recognized as highly effective means of reducing nitrogen oxides. Such processes typically involve passing a nitrogen oxides laden effluent across a catalyst bed in the presence of ammonia, and are capable of achieving nitrogen oxides reductions as high as 50% and even as high as 95% or higher. Unfortunately, the expense of installing and operating the catalyst system in a SCR process can limit the economic viability of the process, even considering the high nitrogen oxides reductions achieved.

BACKGROUND ART

As noted, processes and compositions for the reduction of nitrogen oxides in effluents from the combustion of carbonaceous fuels have been developed extensively over recent years. With the increased attention to the health risks and environmental damage caused by agents such as smog and acid rain, it is expected that $NO_x$ reduction research will continue to be pursued.

Selective catalytic reduction processes for reducing nitrogen oxides levels are well known and utilize a variety of catalytic agents. For instance, in European Patent Application WO 210392, Eichholtz and Weiler discuss the catalytic removal of nitrogen oxides using activated charcoal or activated coke, with the addition of ammonia, as a catalyst. Kato et al. in U.S. Pat. No. 4,138,469 and Henke in U.S. Pat. No. 4,393,031 disclose the catalytic reduction of $NO_x$ using platinum group metals and/or other metals such as titanium, copper, molybdenum, vanadium, tungsten, or oxides thereof with the addition of ammonia to achieve the desired catalytic reduction.

Another catalytic reduction process is disclosed by Canadian Patent 1,100,292 to Knight which relates to the use of a platinum group metal, gold, and/or silver catalyst deposited on a refractory oxide; and Mori et al. in U.S. Pat. No. 4,107,272 discuss the catalytic reduction of nitrogen oxides using oxysulfur, sulfate, or sulfite compounds of vanadium, chromium, manganese, iron, copper, and nickel with the addition of ammonia gas.

In a multi-phase catalytic system, Ginger, in U.S. Pat. No. 4,268,488, discloses exposing a $NO_x$ containing effluent to a first catalyst comprising a copper compound such as copper sulfate and a second catalyst comprising metal combinations such as sulfates of vanadium and iron or tungsten and iron on a carrier in the presence of ammonia.

In addition, in a process which combines SNCR and SCR technology to reduce nitrogen oxides while greatly minimizing the cost of the SCR aspect of the process, Hofmann, Sun, and Luftglass, in U.S. Pat. No. 4,978,514, disclose a process involving first reducing $NO_x$ via an SNCR process using a nitrogenous treatment agent and then contacting the treated effluent with a nitrogen oxides reducing catalyst.

What is desired, therefore, is a process which permits the reduction of effluent nitrogen oxides and plume opacity in gas turbines without the art-recognized drawbacks of the injection of water directly into the combustion can while reducing the capital outlay attendant to the use of an SCR process alone.

DISCLOSURE OF INVENTION

The present invention relates to a method for reducing nitrogen oxides emissions and improving the combustion efficiency of a gas turbine (which term will be considered to be interchangeable with combustion turbine). In particular, this invention relates to a process involving the formation of a stable water and fuel oil emulsion, employing such emulsion as fuel in a gas turbine, and passing the effluent from the combustion of such fuel through a catalysis zone for the catalyzed reduction of nitrogen oxides.

By the use of the process of the present invention, the nitrogen oxides levels in the effluent can be substantially reduced via the use of the emulsified fuel and the catalytic destruction of nitrogen oxides can be effected in a more efficient manner.

BRIEF DESCRIPTION OF THE DRAWINGS

The present invention will be better understood and its advantages more apparent in view of the following detailed description, especially when read with reference to the appended drawings, wherein.

BEST MODE FOR CARRYING OUT THE INVENTION

As noted above, this invention relates to a process which involves the formation of a stable water and fuel oil emulsion. The oil used in the emulsion is a light fuel oil, such as diesel fuel, distillate fuel, or #2 oil. The subject emulsion can be either a water-in-fuel oil or a fuel oil-in-water emulsion (although water-in-fuel oil emulsions are preferred for most applications). The process further comprises the introduction of such emulsions into the combustion can of a gas turbine via the fuel system.

Typically, the oil phase in the inventive emulsions comprises what is conventionally known as diesel fuel, distillate fuel, or #2 oil, as defined by the American Society of Testing and Measurement (ASTM) standard specification for fuel oils (designation: D 396-86). Especially preferred are distillate fuels. Included among these are kerosene (also referred to as #1 oil) and jet fuels, both commercial and military, commonly referred to as Jet-A, JP-4, and JP-5, respectively.

Although demineralized water is not required for the successful control of nitrogen oxides and opacity, the use of demineralized water in the emulsion formed according to the process of this invention is preferred in order to avoid the deposit of minerals from the water on the blades and other internal surfaces of the gas turbine. In this way, turbine life is extended and maintenance and outage time significantly reduced.

The emulsions used in the fuel system of the gas turbine advantageously comprise water-in-fuel oil emulsions having up to about 50% water by weight. Emulsions of this type which have the most practical significance in combustion applications are those having at least about 5% water and are preferably about 10% to about 35% water-in-fuel oil by weight. In addition, this invention also relates to the formation of fuel oil-in-water emulsions having about 50% to about 80% water, which have practical applicability in certain situations.

Advantageously, the emulsions are prepared such that the discontinuous phase (i.e., the water in a water-in-fuel oil emulsion and the oil in a fuel oil-in-water emulsion) has a particle size wherein at least about 70% of the droplets are below about five microns Sauter mean diameter. More preferably, at least about 85%, and most preferably at least about 90%, are below about 5 microns Sauter mean diameter.

Emulsion stability is largely related to droplet size. The primary driving force for emulsion separation is the large energy associated with placing oil molecules in close proximity to water molecules in the form of small droplets. Emulsion breakdown is controlled by how quickly droplets coalesce. Emulsion stability can be enhanced by the use of surfactants and the like, which act as emulsifiers or emulsion stabilizers. These generally work by forming repulsive layers between droplets prohibiting coalescence. The gravitational driving force for phase separation is much more prominent for large droplets so emulsions containing large droplets separate more rapidly.

Smaller droplets also settle, but can be less prone to coalescence which is the cause of creaming. If droplets are sufficiently small, the force of gravity acting on the droplet is small compared to thermal fluctuations or subtle mechanical agitation forces. In this case, the emulsion can become stable almost indefinitely, although given a long enough period of time, even these emulsions will eventually separate.

Because of the operating characteristics of gas turbines, it is required that the water/fuel oil emulsion exhibit a high degree of stability. In most cases, gas turbines are "peaking" units, as noted, which do not operate regularly. Accordingly, an emulsified fuel may sit stagnant for extended periods or with only mild recirculation in the fuel line. In order to avoid separation of the emulsion into its components, which can cause slugs of water to be injected through the burner nozzle leading to combustion problems and possible engine damage, an emulsifier or emulsion stabilizer is also desirable in the water/fuel oil emulsion.

The emulsifier utilized advantageously comprises a composition selected from one or more alkanolamides, by which is generally meant an amide formed by condensation of an alkyl or hydroxyalkyl amine, or mixtures thereof, and an organic acid. Preferred acids are fatty acids, such as lauric acid, linoleic acid, oleic acid, stearic acid, and coconut oil fatty acids. Most preferred are alkanolamides having a molar ratio of amine group to acid group of from about 1:1 to about 2:1.

Surprisingly, these compositions can stabilize an emulsion of up to about 50% water-in-fuel oil, or up to about 80% fuel oil-in-water in alkanolamide amounts as low as about 0.05% by weight and even as low as about 0.01% by weight. In fact, although there is no true maximum amount of emulsifier which can be used, there is usually no need for greater than about 1% or, in fact, greater than about 0.5% by weight emulsifier in the subject emulsion. Advantageously, to stabilize an emulsion of up to about 50% water-in-fuel oil the noted alkanolamides should be included in an amount of from about 0.1% to about 0.3% by weight.

Suitable alkanolamides which can function to stabilize the emulsion of the process of the present invention include any one or more of the following: oleic diethanolamide, cocamide diethanolamine (DEA), lauramide DEA, polyoxyethylene (POE) cocamide, cocamide monoethanolamide (MEA), POE lauramide DEA, oleamide DEA, linoleamide DEA, oleic triethanolamine, and stearamide MEA, as well as mixtures thereof. Such alkanolamides are commercially available under tradenames such as Clindrol 100-0, from Clintwood Chemical Company of Chicago, Ill.; Schercomide ODA, from Scher Chemicals, Inc. of Clifton, N.J.; Schercomide SO-A, also from Scher Chemicals, Inc.; and Mazamide ®, and the Mazamide series from PPG-Mazer Products Corp. of Gurnee, Ill.

Other emulsifiers which may be useful include ethoxylated alkylphenols, such as nonyl, phenol, octyl phenol, etc. and salts of alkylated sulfates or sulfonates, such as sodium lauryl sulfate. In addition, the skilled artisan will recognize that other emulsifiers or blends of emulsifiers may also be effective at maintaining the stability of the inventive emulsion.

The use of the noted emulsifiers provides chemical emulsification, which is dependent on hydrophylic-lipophylic balance (HLB), as well as on the chemical nature of the emulsifier. The HLB of an emulsifier is an expression of the balance of the size and strength of the hydrophylic and the lipophylic groups of the composition.

The HLB, which was developed as a guide to emulsifiers by ICI America's, Inc. of Wilmington, Del. can be determined in a number of ways. Most conveniently for the purposes of this invention, the HLB can be determined by the solubility or dispersively characteristics of the emulsifier in water, from no dispersively (HLB range of 1 to 4) to clear solution (HLB range of 13 or greater). The emulsifiers useful in the present invention should most preferably have an HLB of 8 or less, meaning that after vigorous agitation they form a milky dispersion in water (HLB range of 6 to 8), poor dispersion in water (HLB range of 4 to 6), or show no dispersively in water (HLB range of less than 4).

Most advantageously, emulsifiction is aided by use of an emulsification system which comprises about 25% to about 85% by weight of an amide, especially an alkanolamide or n-substitutd alkyl amine; about 5% to about 25% by weight of a phenolic surfactant; and about 0% to about 40% by weight of a difunctional block polymer terminating in a primary hydroxyl group. More preferably, the amide comprises about 45% to about 65% of the emulsification system; the phenolic surfactant about 5% to about 15%; and the difunctional block polymer about 30% to about 40% of the emulsification system. Such emulsification system is taught by Dubin and Wegrzyn in U.S. Patent Application entitled "Emulsification System for Light Fuel Oil Emulsions" having Ser. No. 07/770,979, filed Oct. 1, 1991, the disclosure of which is incorporated herein by reference.

Suitable n-substituted alkyl amines and alkanolamides which can function to stabilize the emulsion of the present invention are those formed by the condensation of, respectively, an alkyl amine and an organic acid or a hydroxyalkyl amine and an organic acid, which is preferably of a length normally associated with fatty acids. They can be mono-, di-, or triethanolamines and include those alkanolamides discussed above.

The phenolic surfactant is preferably an ethoxylated alkyl phenol such as an ethoxylated nonylphenol or octylphenol, especially ethylene oxide nonylphenol which is available commercially under the tradename Triton N from Union Carbide Corporation of Danbury, Conn. and Igepal CO from Rhone-Poulenc Company of Wilmington, Del.

The block polymer which is an optional element of the emulsification system of the present invention advantageously comprises a nonionic, difunctional block polymer which terminates in a primary hydroxyl group and has a molecular weight ranging from about 1,000 to above about 15,000. Such polymers are generally considered to be polyoxyalkylene derivatives of propylene glycol and are commercially available under the tradename Pluronic from BASF-Wyandotte Company of Wyandotte, N.J. Preferred among these polymers are propylene oxide/ethylene oxide block polymers commercially available as Pluronic 17R1.

In addition to the noted components, the emulsification system of the present invention may further comprise up to about 30% and preferably about 10 to about 25% of a light crude naphtha fuel oil, most preferably the fuel oil which comprises the continuous phase of the inventive emulsion. It has been found that inclusion of the fuel oil in the emulsification system can in some cases increase emulsion stability of the emulsion itself. In addition, other components such as salts of alkylated sulfates or sulfonates such as sodium lauryl sulfate and alkanolamine sulfonates may also be included in the inventive emulsification system.

The noted emulsification system should most preferably also have an HLB of 8 or less, meaning that after vigorous agitation they form a milky dispersion in water (HLB range of 6–8), poor dispersion in water (HLB range of 4–6), or show no dispersability in water (HLB range of less than 4). Although the precise explanation is unknown, it is believed that the inventive emulsification system provides superior emulsification because it comprises a plurality of components of different HLB values. Desirably, the emulsification system has a combined HLB of at least about 4.0, more preferably about 5.1 to about 7.0 to achieve this superior emulsification.

For instance, an emulsification system which comprises 70% oleic diethanolamide (average HLB 6), 10% ethylene oxide nonylphenol (average HLB 13), and 20% #2 fuel oil has a combined HLB of about 5.5 (70%×6 plus 10%×13). An emulsification system which comprises 50% oleic diethanolamide, 15% ethylene oxide nonylphenol and 35% of a propylene oxide/ethylene oxide block polymer (average HLB 2.5) has a combined HLB of about 5.8 (50%×6 plus 15%×13 plus 35%×2.5). Such emulsification systems would provide superior emulsification as compared with an emulsifier comprising 80% oleic diethanolamide and 20% #2 fuel oil, which has an HLB of about 4.8 (80%×6).

It is also possible to utilize a physical emulsion stabilizer in combination with the chemical emulsifiers noted above to maximize the stability of the emulsion achieved in the process of the present invention. Use of physical stabilizers also provides economic benefits due to their relatively low cost. Although not wishing to be bound by any theory, it is believed that physical stabilizers increase emulsion stability, either by increasing the solubility of immiscible phases or by forming an insoluble barrier attracted to the oil/water interface. Exemplary of suitable physical stabilizers are waxes, cellulose products, and gums such as whalen gum and xanthan gum.

When utilizing both chemical emulsifiers and physical emulsion stabilizers, the physical stabilizer is present in an amount of about 0.05% to about 5% by weight of the combination of chemical emulsifier and physical stabilizer. The resulting combination can then be used at the same levels noted above for the use of emulsifiers alone.

The emulsification provided must be sufficient to maintain the emulsion to a greater extent than if the emulsifier was not present and to as great an extent as possible. The actual level of emulsification will vary depending on the percentage of oil and water in the emulsion and the particular fuel oil utilized. For example, when the continuous phase is #2 oil, it is highly desired that no more than about 0.1% free water be present in the emulsion, and that the emulsion be maintained that way at ambient conditions for at least about two hours. Ambient conditions, that is the conditions to which the emulsion is expected to be exposed, includes the temperature in the gas turbine fuel feed lines. Such temperatures can be up to about 65° C., more typically up to about 90° C., and even as high as about 100° C.

The emulsion used in the process of the present invention can be formed using a suitable mechanical emulsifying apparatus which would be familiar to the skilled artisan. Advantageously, the apparatus is an in-line emulsifying device for most efficiency. The emulsion is formed by feeding both the water and the fuel oil in the desired proportions to the emulsifying apparatus, and emulsifier or stabilizer when used can either be admixed or dispersed into one or both of the components before emulsification or it can be added to the emulsion after it is formed.

Preferably, the emulsifier and/or stabilizer is present at the time of emulsifying the water and fuel oil. Most advantageously, any emulsifier or stabilizer used is provided in the water phase, depending on its HLB. It has been found that the emulsions noted above with the chemical emulsifiers can be stabilized at up to about 50% water-in-fuel oil for up to 30 days and longer. In fact, with mild agitation such as recirculation, it is believed that the emulsion can stay in suspension indefinitely.

Surprisingly, the emulsion can then be introduced into the combustion can of the gas turbine through the fuel feed lines and burner nozzles conventionally used with such combustion apparatus. There is no need for modification of the gas turbine fuel feed lines or combustion can to accommodate the emulsion, which eliminates costly retrofitting of the gas turbine fuel system.

Figure 1:
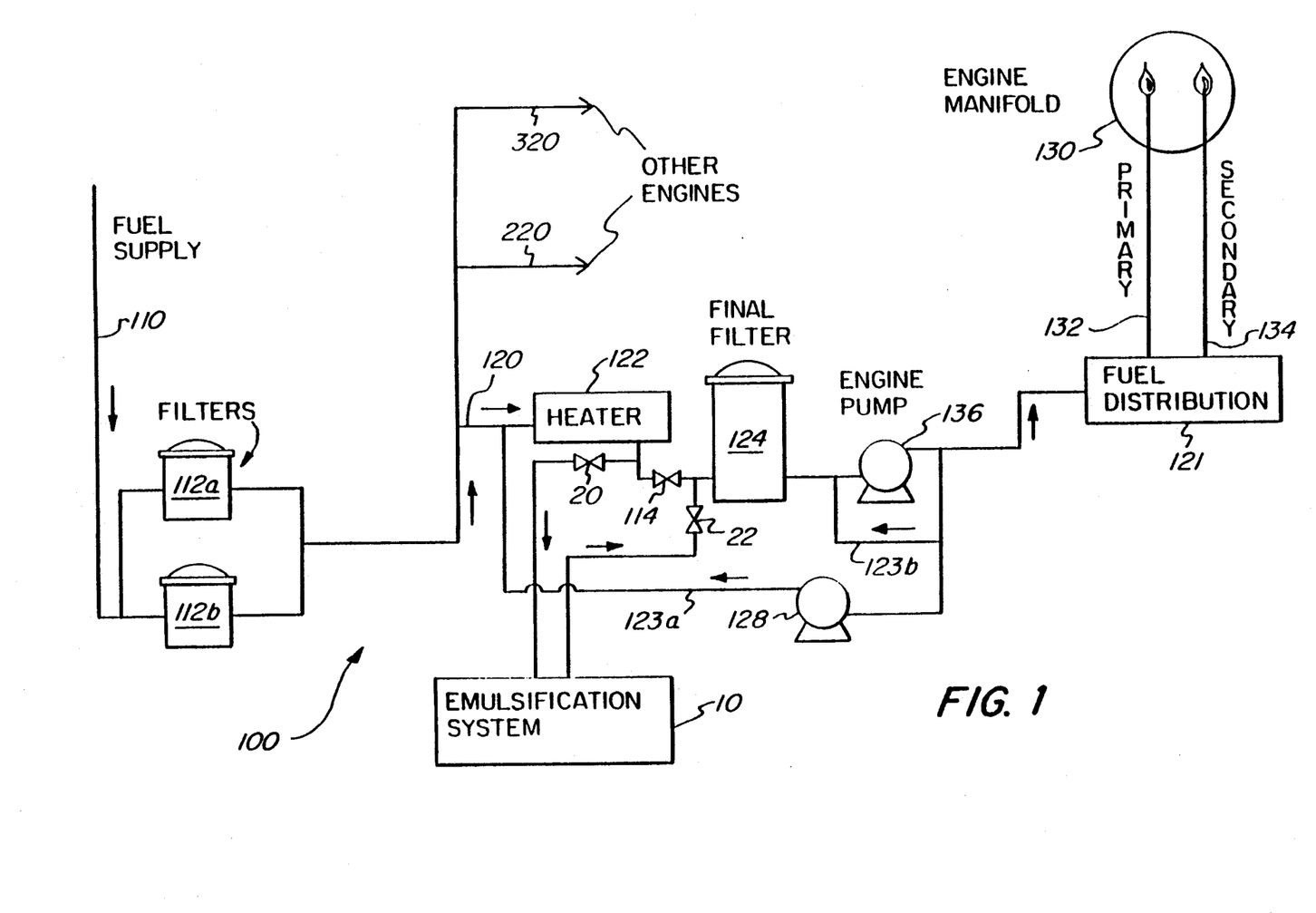
FIG. 1 is a schematic illustration of a gas turbine fuel supply system having an emulsfication system according to the present invention installed therein.
Figure 2:
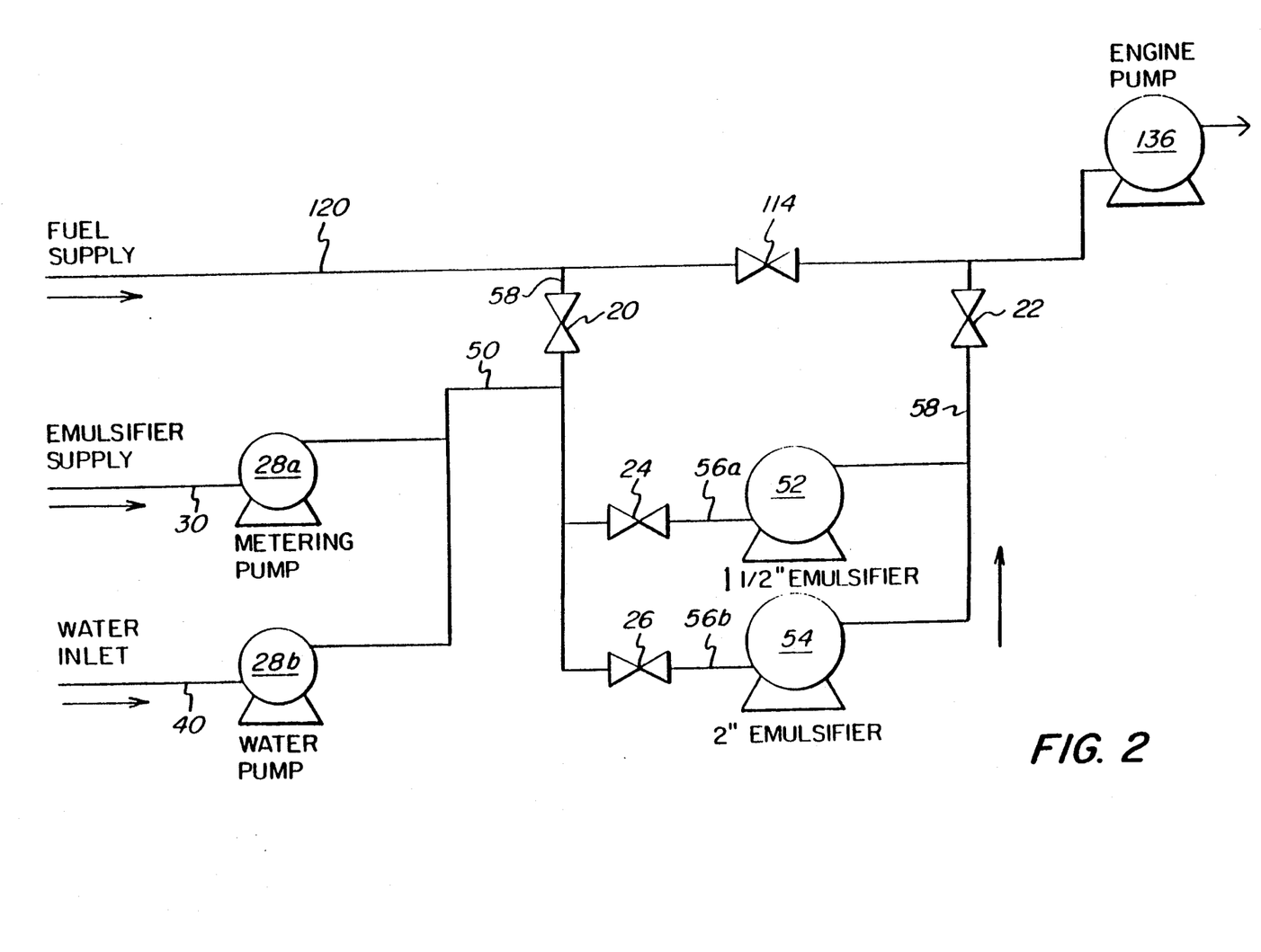
FIG. 2 is a schematic illustration of an emulsification system according to the present invention as installed in a gas turbine fuel supply system.

FIGS. 1 and 2 illustrate a gas turbine fuel supply system having installed therein an emulsification system for the practice of the process of the present invention and a schematic illustration of the emulsification system itself. As illustrated in FIG. 1, an emulsification system 10 can be installed in a gas turbine fuel supply system 100 between the heater 122 and the final filter 124. Although emulsification system 10 is illustrated as being installed in this position in fuel supply system 100, it will be recognized by the skilled artisan that other positions may be more advantageous in terms of emulsion stability in other fuel supply system embodiments and emulsification system 10 can be installed at virtually any point along fuel supply system 100 for operability. Indeed, it will also be recognized that heater 122 and final filter 124 are preferred components of fuel supply system 100 and conventionally utilized but not critically needed.

Fuel supply system 100 is typical of many gas turbine fuel supply systems and generally comprises a fuel supply line 110 which is fed by a fuel tank or other holding or storage apparatus (not shown). Fuel flowing through fuel supply line 110 proceeds through a set of initial filters 112a and 112b, and is then fed to individual fuel supply systems 120, 220, and 320, which feed combustion cans (or engines) controlled by fuel supply system 100. For ease of understanding, fuel supply system 120, which feeds engine manifold 130, is specifically illustrated. Supply systems 220 and 320 are equivalent in operation.

Fuel supplied through fuel supply line 110 is fed along engine manifold 130 supply line 120 into heater 122. From there, the fuel flow continues past valve 114 into final filter 124. From final filter 124, the fuel flow continues along line 120 through engine pump 136 and from there into fuel distribution manifold 121 which then supplies the fuel through primary nozzle 132 and secondary nozzle 134 to engine manifold 130, which is the combustion can of the gas turbine. In addition, fuel supply system 1?0 further comprises recirculation lines 123a and 123b and recirculation pump 128 for recirculation of the fuel through line 120.

When valve 114 in fuel supply line 120 is closed, and valves 20 and 22 in emulsification system 10 are open, fuel flowing along fuel supply line 120 is shunted through emulsification system 10 after heater 122, and is resupplied to fuel supply line 120 before final filter 124 for feeding to engine manifold 130 for recirculation.

As illustrated in FIG. 2, emulsification system 10 comprises an emulsifier supply line 30 which supplies emulsifier from a tank or other storage means (not shown) to a metering pump 28a, which then feeds emulsifier through line 50. In addition, emulsification system 10 comprises water inlet line 40 which feeds water from a tank or other supply means (not shown) through a water pump 28b to supply line 50 where it is admixed with emulsifier supplied from emulsifier supply line 30.

The water/emulsifier fed through line 50 then meets fuel being fed through line 58 when valve 20 is open and valve 114 is closed. These are then fed through either one or both of 1½ inch emulsifier 52 or 2 inch emulsifier 54, depending on whether one or both of valves 24 or 26 is open through feed lines 56a and 56b, respectively. The emulsified water-in-fuel oil is then fed via line 58 back through fuel supply line 120 when valve 22 is open and from there into engine pump 136 and into engine manifold 130.

Although not wishing to be bound by any theory, it is believed that the use of an emulsion provides striking advantages over separate water injection systems because the water is being provided internal to the flame. By doing so, less water is required to achieve superior results which reduces the deleterious effects of directly introducing large amounts of water to the combustion zone of the gas turbine.

Because of the advantages of introducing water internal to the flame, utilization of the inventive process results in a reduced use of demineralized water (since the emulsion contains less than the 1:1 ratio of water to fuel oil used when water is injected directly into the combustion can), and leads to less thermal stress which reduces maintenance cost and outage time.

When the emulsified fuel is introduced into the combustion zone, the heat of vaporization from combustion of the fuel causes the emulsified water droplets to become steam which creates a secondary atomization. This secondary atomization improves combustion and increases the gas volume. In addition, the heat required to change the water to steam is believed to reduce the flame temperature of the combustion which helps to reduce formation of nitrogen oxides.

Additionally, use of the water/fuel oil emulsion results in substantial elimination of the need for an expensive, independent smoke suppressant additive. Typically, such additives are heavy metal based products, which can form deposits on the turbine blades reducing efficiency and increasing maintenance costs. By the use of emulsions in the process of this invention, a 90% or greater reduction in smoke suppressant additive use is often achieved which increases the blade life due to reduced deposits and creates less wear on the turbine blade coatings. These advantages all lead to significant savings in operating and maintenance cost.

Furthermore, when compared to a separate water injection system, the use of the process of this invention leads to improved engine fuel system integrity; the engine burns cooler, which as noted, leads to less thermal stress; it is believed that the gas turbine can assume a higher load capacity; and compliance with environmental regulations is more easily obtainable.

After introduction into the combustion can of the gas turbine, the emulsion prepared as described above is combusted and the effluent passed through a catalysis zone and over a catalyst. The catalyst used is one capable of reducing the effluent nitrogen oxides concentration. Such a catalyst comprises, for instance, activated carbon, charcoal, or coke, vanadium oxide, tungsten oxide, titanium oxide, iron oxide, copper oxide, manganese oxide, chromium oxide, noble metals such as platinum group metals like platinum, palladium, rhodium, and iridium, or mixtures of these. Other catalyst materials conventional in the art and familiar to the skilled artisan can also be utilized. These catalyst materials are typically mounted on a support such as a ceramic substance or a zeolite although other art known supports can also be used.

Typically, the effluent is passed over the catalyst while at a temperature of between about 400° F. to about 1000° F., more preferably about 450° F. to about 850° F. Depending on the particular catalyst used, it may be necessary to inject or otherwise introduce ammonia into the effluent in order to facilitate the catalytic destruction of $NO_x$.

The introduction of ammonia may be reduced or avoided by the use of a tailored, non-catalytic $NO_x$ reducing process to provide sufficient ammonia for the catalytic step. Such a process is disclosed in U.S. Pat. No. 4,978,514 to Hofmann, Sun, and Luftglass, and U.S. Patent Application entitled "Catalytic/Non-Catalytic Combination Process for Nitrogen Oxides Reduction" having Ser. No. 07/626,439, filed in the names of Luftglass, Sun, and Hofmann on Dec. 12, 1990, the disclosure of which is incorporated herein by reference, and involves the introduction of a nitrogenous treatment agent into the effluent under conditions effective to create an ammonia containing effluent.

Such nitrogenous treatment agent comprises a composition having at least one component containing as an element thereof nitrogen. Suitable compositions preferably comprise urea or ammonia. Additional treatment agents include urea or ammonia, optionally enhanced by other compositions such as hexamethylenetetramine (HMTA), oxygenated hydrocarbons such as ethylene glycol, ammonium salts of organic acids such as ammonium acetate and ammonium benzoate, heterocyclic hydrocarbons having at least one cyclic oxygen such as furfural, sugar, molasses, 5- or 6-membered heterocyclic hydrocarbons having at least one cyclic nitrogen such as pyridine and pyrolidine, hydroxy amino hydrocarbons such as milk or skimmed milk, amino acids, proteins and monoethanolamine and various other compounds which are disclosed as being effective at the reduction of nitrogen oxides in an effluent.

When the treatment agent comprises urea, ammonia, or another nitrogenous treatment agent it is preferably introduced at an effluent temperature of up to about 1500° F., more preferably about 230° F. to about 1500° F., most preferably about 400° F. to about 1200° F. These effluent temperatures at the point of introduction can be varied depending on the particular components of the treatment agent and other effluent conditions, such as the effluent oxygen level, as discussed in the referenced disclosures.

The treatment agent is introduced into the effluent at a molar ratio of the nitrogen in the treatment agent to the baseline nitrogen oxides level in the effluent of about 1:10 to about 10:1. More preferably, the molar ratio of treatment agent nitrogen to baseline $NO_x$ level is about 1:5 to about 5:1. By "baseline nitrogen oxides level" is meant the level (measured or calculated) of nitrogen oxides in the effluent prior to introduction of the treatment agent. Such baseline $NO_x$ level can also be used in calculating the percentage of nitrogen oxides reduced by measuring the level of nitrogen oxides in the effluent after treatment, dividing that number by the baseline nitrogen oxides level, subtracting from unity, and multiplying by 100 to give the $NO_x$ reduction expressed as percentage of baseline.

The presence of ammonia in the post-treatment effluent can be ensured by varying the effluent temperature (by, for instance, adjusting the location at which the introduction occurs), specific composition and introduction ratio of the treatment agent. These parameters should be adjusted to provide the desired molar ratio of ammonia to nitrogen oxides in the effluent.

The introduction temperature of a treatment agent, especially a nitrogenous treatment agent, has predictable effects on both nitrogen oxides reductions achieved and on the amount of ammonia remaining in the effluent after introduction of the treatment agent. With knowledge of this information, the nature (i.e., composition) and introduction of the treatment agent can be carefully coordinated to produce the desired amount of ammonia in the effluent even where the choice of introduction temperatures cannot be altered (in many boilers, retrofitting or providing access for different injection levels is not always possible or economically feasible). Typically, this involves introducing a treatment agent such that it is acting on the "left" side of the plateau of its nitrogen oxides reduction versus effluent temperature curve at the effluent temperature at the point of introduction, in order to generate sufficient ammonia for the catalytic aspect of the process.

The introduction rate or other equivalent parameters such as the normalized stoichiometric ratio can also be adjusted to provide the desired ammonia levels (by normalized stoichiometric ratio is meant the ratio of the concentration of theoretically available reducing radicals such as $NH_2$ or NCO radicals to the concentration of nitrogen oxides in the effluent; alternatively, the molar ratio of the treatment agent to the $NO_x$ concentration can be used in place of NSR when the chemistry of reduction is not well defined; the term NSR as used herein will also be understood to encompass molar ratio when appropriate).

After introduction of the treatment agent, the effluent contains ammonia in the molar ratio of ammonia to $NO_x$ which which remains in the effluent of about 1:10 to about 10:1, more preferably about 1:2 to about 2:1. In this way, ammonia is present in the effluent to react with the remaining effluent $NO_x$ in the reaction catalyzed by the catalyst, such that both ammonia and nitrogen oxides are decomposed.

In addition, the independent introduction of ammonia to facilitate the catalytic reduction of $NO_x$ can be avoided or reduced in the above-described manner by introducing into the effluent one or more of the hydrolysis products of urea. Suitable urea hydrolysis products which can be used include ammonium carbamate ($NH_2COONH_4$), ammonium carbonate (($NH_4)CO_3$), a mixture of ammonia ($NH_3$) and ammonium bicarbonate ($NH_4HCO_3$), as well as complexes and mixtures thereof.

As noted by von Harpe, Pachaly, Lin, Diep, and Wegrzyn in U.S. Patent Application entitled "Nitrogen Oxides Reduction Using a Urea Hydrolysate", Ser. No. 07/820,907, filed Jan. 16, 1992, the disclosure of which is incorporated herein by reference, under the proper conditions, urea hydrolyzes to products which are believed to include ammonia ($NH_3$), ammonium carbamate ($NH_2COONH_4$) ("carbamate"), ammonium carbonate (($NH_4)_2CO_3$) ("carbonate"), and ammonium bicarbonate ($NH_4HCO_3$) ("bicarbonate"). Hydrolysis generally continues sequentially from carbamate, through carbonate and then to bicarbonate, each composition being more stable than the previous one.

Although each of the noted hydrolysis products is individually commercially available, it is more desirable to produce them via urea hydrolysis under the conditions detailed below. This is because the thusly formed hydrolysate has advantages over the individual hydrolysis products, even if combined in the same approximate ratios. A primary advantage is cost, since urea can be significantly less expensive than the individual hydrolysis products. Additionally, a maximum solubility of about 25% for the hydrolysate (based on initial urea concentration) has been observed, which is superior to the solubility of bicarbonate, i.e., about 18%. This can be significant in terms of transportation costs and final treatment agent concentrations.

According to solubility and structural analyses, including high pressure liquid chromatography (HPLC) using phosphoric acid as solvent; carbon-13 nuclear magnetic resonance specroscopy (NMR); thermal gravimetric analysis (TGA); differential scanning calorimetry (DSC); and measurement of "P" or "M" alkalinity by acid titration, the hydrolysate prepared according to this invention comprises at least in part a single unique structure of carbonate and bicarbonate which is in a complex with carbamate (expressed as carbamate bi-carbonate/carbonate). If the pressure exerted on the hydrolysate solution is sufficiently high, ammonia also produced does not flash off, but remains in solution and available to contribute to the reduction of $NO_x$. In addition, depending on the conditions employed, residual urea may also be present.

In forming the urea hydrolysate, temperature, pressure, concentration of the initial urea solution, and residence time are all important parameters, and must be balanced. High pressure is particularly useful because the reaction proceeds in the direction of smaller mole volumes during the formation of carbamate and carbonate. Higher temperature and longer residence times also result in higher levels of hydrolysis. However, under equivalent pressures, temperatures and residence times, hydrolysis decreases with increases in solution concentration.

Advantageously, hydrolysis of a 10% aqueous urea solution should be conducted under pressures sufficiently high to maintain the resulting hydrolysate in solution. Such pressures will also facilitate hydrolysis. Desirably, hydrolysis is performed under pressures of at least about 500 pounds per square inch (psi), more preferably at least about 650 psi. If it is desired to maintain ammonia in solution, the pressure should be at least about 750 psi. As the concentration of the initial urea solution is increased, the pressure is preferably increased to achieve equivalent results.

There is no true upper limit of pressure in terms of facilitating hydrolysis; rather, any upper limits comprise practical as opposed to technical limits, since higher presures, i.e., pressures above about 3000 psi, require vessels able to stand such pressures, which are generally more expensive and usually unnecessary.

At the desired pressures, the temperatures and residence times can be varied depending on the degree of hydrolysis sought. If relatively little hydrolysate is desired (i.e., no more than about 5%), temperatures of only about 250° F. are desired, whereas temperatures of only about 600° F. to 700° F. will ensure that virtually all the urea has been converted to hydrolysate. Residence times can vary between about three minutes and about 14 minutes, preferably about five minutes to about 10 minutes. It will be recognized that the upper temperature and residence time limits are less important since exceeding them will not result in lower levels of hydrolysis or a less effective hydrolysate, it is believed.

The temperature and residence time for urea hydrolysis are related, and one (i.e., time) can be decreased as the other (i.e., temperature) is increased. For instance, hydrolysis at 400° F. for 10 minutes may be generally equivalent to hydrolysis at 500° F. for five minutes and hydrolysis at 600° F. for three minutes.

Most preferably, the hydrolysis of urea is conducted in the presence of metal catalysts such as copper catalysts like copper nitrate, nickel catalysts like nickel sulfate, and iron catalysts like iron (III) nitrate, with the copper and nickel catalysts preferred. Since such catalysts enhance urea hydrolysis, greater reductions in nitrogen oxides can be achieved with equivalent hydrolysis conditions by the use of the catalysts. The catalyst metal is mixed into the urea solution prior to hydrolysis. For instance between about 5 and about 15, preferably about 10 ppm of catalyst (as metal) is mixed into a 10% urea solution, whereas about 40 to about 60, preferably about 50 ppm is mixed into a 25% urea solution.

Generally, the hydrolyzed urea solution of this invention is introduced into the effluent at an effluent temperature wherein the hydrolysis products readily convert to ammonia in order to facilitate the catalytic reduction of nitrogen oxides. As is generally the case with nitrogenous treatment agent introductions discussed herein, the effluent temperature at the point of introduction should also be chosen so as to avoid the utilization of the urea hydrolysis products, or ammonia, to reduce $NO_x$ via an SNCR pathway. Although some utilization in this way is not disadvantageous, utilization to a great extent will decrease the amount of ammonia to undesirable levels in terms of the SCR $NO_x$ reduction. Accordingly, introduction of the urea hydrolysis products should be at an effluent temperature below about 1500° F., more preferably about 230° F. to about 1500° F. Most preferably, the effluent temperature at the point of introduction of the urea hydrolysis products should be between about 550° F. and about 850° F.

Advantageously, the hydrolysis products are introduced into the effluent in an amount sufficient to provide a molar ratio of the ammonia resulting from degradation of the hydrolysis products to the baseline nitrogen oxides level of about 1:10 to about 10:1. More preferably, the hydrolyzed solution is introduced into the effluent to provide a molar ratio of ammonia to baseline nitrogen oxides of about 1:3 to about 5:1, most preferably about 1:2 to about 3:1.

Figure 3:
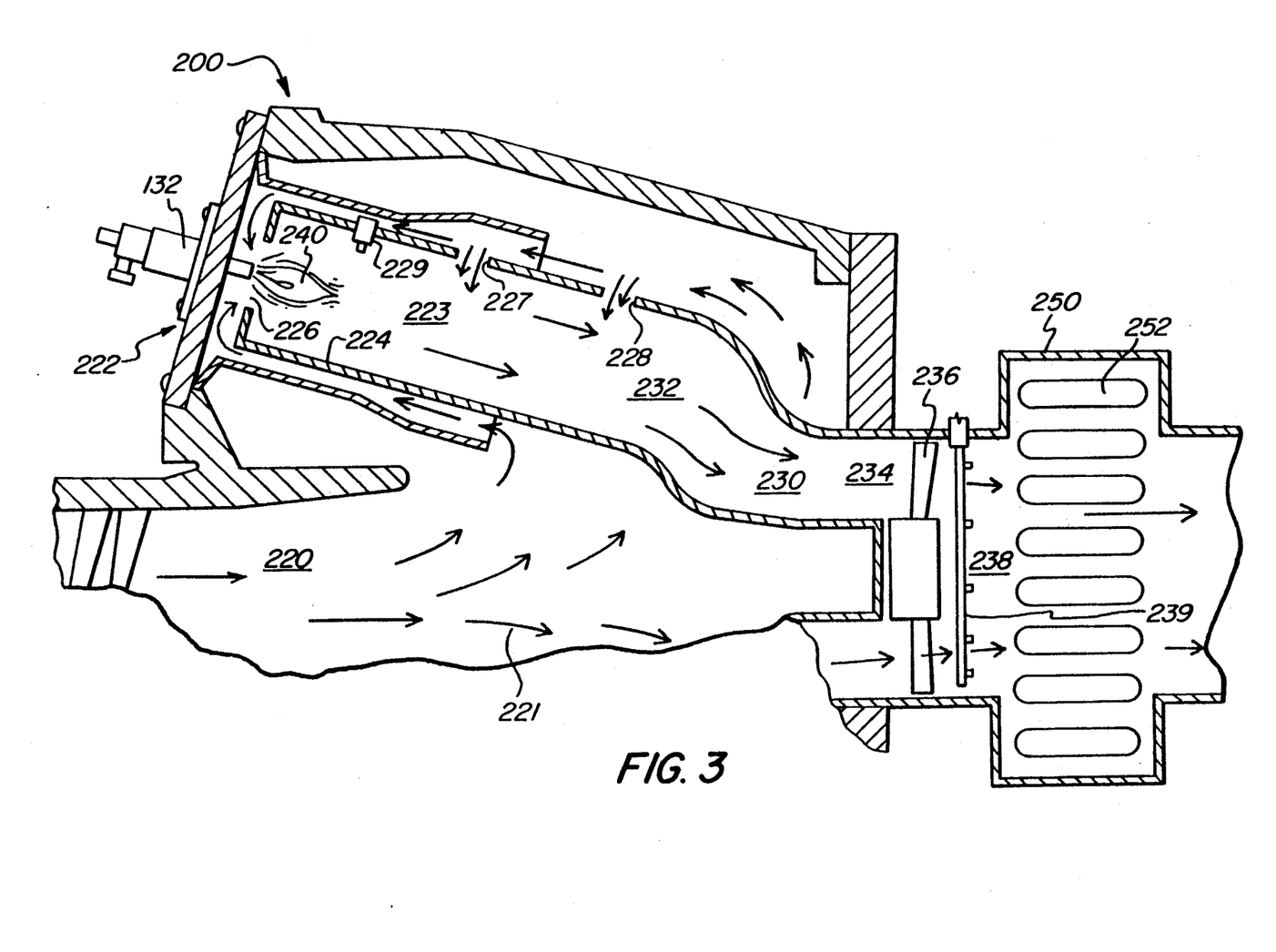
FIG. 3 is a schematic illustration of a gas turbine effluent conduit having the SCR installation of the present invention therein.

A portion of a typical gas turbine in which the process of the present invention can be practiced is schematically illustrated in FIG. 3. Gas turbine 200 has a gas compression stage (the discharge section thereof is shown as 220) where combustion air (represented by arrows 221) is compressed to a high pressure. This pressure typically is in the range from about seven to about 12 atmospheres, depending upon the design of and the operational load on the gas turbine.

FIG. 3 shows a cross-section of one combustion chamber casing 222 and schematically represents the important functional aspects as relate to the operation of the present invention. A plurality of these combustion chamber casings, generally ten, are positioned radially about the central axis of the turbine, each receiving air from the compressor and discharging hot gases to drive the turbine.

The compressed gas 221 is supplied to a combustion section 223, through wall 224 defining the combustion can, at successively positioned openings in the can, e.g., 226, 227, and 228, to achieve continuous combustion of fuel and establish desired temperature and pressure levels. In practice, openings are provided at a plurality of points around the periphery of the wall 224 to achieve uniform distribution. A transition section 230 is provided at the discharge end 232 of the combustion section 223 to provide a high speed heated gas flow to a turbine section 234. These flows are typically within the range of 50 to 150 meters per second. The turbine section 234 has turbine blades, such as 236, to convert the power of the pressurized axial gas flow to rotary power for transmission by a shaft (not shown) as power output and to operate the compressor stage.

Gas pressure and temperature both vary with and decrease with decreasing loads. The temperature levels generated within the gas turbine when operating near full load typically range from over 2000° C. near flame 240, to 1000° C. or below at the discharge end 232. Pressures will be fairly uniform within the combustion can for a given load and will vary from near 12 atmospheres at full load to as low as about seven atmospheres at minimal load. For a given load, temperature will decrease with the axial distance from the flame 240.

Also disposed through wall 224 is at least one injection means 229 and related supply equipment (not shown), which can function to introduce a nitrogenous treatment agent, as discussed above, into the effluent. By control of the placement of injection means 229 and the composition and introduction rate of the nitrogenous treatment agent, the presence of sufficient ammonia to facilitate the catalytic reduction of nitrogen oxides can be ensured.

Following the turbine section 234, the effluent continues along conduit 238, until it encounters a catalysis zone 50, which contains catalyst 252, comprising catalyst material loaded on a support. The effluent passes over catalyst 252, which reacts $NO_x$ to form $N_2$ and is then exhausted.

Conduit 238 also has disposed therein injection means 239 and related supply equipment (not shown), which can function to introduce into the effluent one or more of the hydrolysis products of urea. As noted above, this can help ensure the presence of sufficient ammonia to facilitate the catalytic reduction of nitrogen oxide.

The use of the process of this invention to achieve target levels of nitrogen oxides reductions creates a lessened need for catalyst as compared to an SCR process when used alone. For example, if a 90% reduction in $NO_x$ is desired, the use of the emulsified fuel described above can reduce about 50% to about 60% of the nitrogen oxides, which thereby lessens the burden on the catalytic portion from 90% to less than about 80%. This 10% change represents an increase in the space velocity (the ratio of flue gas flow to catalyst volume) by a factor of up to 2 or, in other words, leads to a 50% reduction in catalyst volume needed for a given effluent flow. Such a reduction substantially increases the practicality and economy of the process since the catalyst is by far the most expensive part.

Moreover, the use of less catalyst reduces the amount of spent catalyst which must be disposed of. As is well known in the art, the disposal of spent catalyst is difficult due to the environmental concerns engendered thereby. Since typical SCR catalysts are oxides of heavy metals as noted above, disposal is costly and tightly regulated. By the reduction of catalyst volume by 50% or greater, these concerns are significantly reduced.

Accordingly, the process of the present invention can lead to substantially improved efficiency and economy of $NO_x$ reduction, especially where significant reductions are desired.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A process for the reduction of nitrogen oxides in the effluent from the combustion of a gas turbine having a combustion zone, the process comprising:
    a) forming an emulsion which comprises water and fuel oil, wherein said emulsion comprises about 5% to about 50% water in a water-in-fuel oil emulsion and about 50% to about 80% water in a fuel oil-in-water emulsion, and feeding said emulsion to the combustion zone of a gas turbine;
    b) combusting said emulsion in the combustion zone to form an effluent; and
    c) disposing a catalyst effective for the reduction of nitrogen oxides in an effluent such that the effluent flows thereover.

2. The process of claim 1, wherein said emulsion comprises up to about 50% water-in-fuel oil.

3. The process of claim 2, wherein said fuel oil is selected from the group consisting of distillate fuel, kerosene, jet fuel, diesel fuel, and #2 oil.

4. The process of claim 3, wherein said emulsion further comprises an emulsifier having an HLB of 8 or less in an amount of about 0.01% to about 1.0%.

5. The process of claim 1, wherein said emulsion further comprises an emulsifier having an HLB of 8 or less in an amount of about 0.01% to about 1.0%.

6. The process of claim 1, wherein said catalyst comprises a compound selected from the group consisting of activated coal, activated charcoal, activated coke, platinum, palladium, rhodium, iridium, vanadium, titanium, iron, copper, manganese, and oxides and mixtures thereof on a support.

7. The process of claim 6, wherein the effluent when contacted with said catalyst is at a temperature of about 400° F. to about 1000° F.

8. The process of claim 1, which further comprises contacting the treated effluent with a catalyst effective for the reduction of carbon monoxide in the effluent.

9. The process of claim 8, which further comprises providing ammonia into the effluent to facilitate the reduction of nitrogen oxides by said catalyst.

10. The process of claim 9, which further comprises introducing a nitrogenous treatment agent into the effluent under conditions effective to create a treated effluent having ammonia present therein.

11. The process of claim 9, which further comprises introducing one or more of the hydrolysis products of urea into the effluent under conditions effective to create a treated effluent having ammonia present therein.

* * * * *

UNITED STATES PATENT AND TRADEMARK OFFICE
CERTIFICATE OF CORRECTION

PATENT NO. : 5,298,230
DATED : March 29, 1994
INVENTOR(S) : Steven C. Argabright, et al It is certified that error appears in the above-indentified patent and that said Letters Patent is hereby corrected as shown below:

At column 8, line 24, "supply system 1?0" should read --supply system 100--

Signed and Sealed this

Sixteenth Day of August, 1994

*Attest:*

BRUCE LEHMAN

*Attesting Officer*  *Commissioner of Patents and Trademarks*